United States Patent Office 3,296,213
Patented Jan. 3, 1967

3,296,213
AROMATIC-ALIPHATIC COPOLYAMIDES
Jack Preston, Raleigh, N.C., assignor to Monsanto
Company, a corporation of Delaware
No Drawing. Filed June 19, 1963, Ser. No. 288,835
14 Claims. (Cl. 260—78)

This invention relates to novel compositions of matter which are copolyamides having aromatic amide segments alternating with aliphatic amide segments. More particularly, the invention relates to the provision and preparation of copolyamides which are prepared from symmetrical aromatic diamines containing preformed amide linkages and dibasic aliphatic acid derivatives.

Both aromatic and aliphatic polyamides are well known in the prior art. Also, polyamides are known which are composed of both aliphatic and aromatic segments. However, the latter polyamides are of inferior quality insofar as their usefulness in a wide range of general applications is concerned. There have been no reported instances of the preparation of copolyamides containing symmetrical wholly aromatic diamine segments alternating with aliphatic dibasic acid segments, such as in the present invention.

It is, therefore, an object of the present invention to provide new compositions of matter comprising aromatic-aliphatic polyamides.

It is another object of the invention to provide aromatic-aliphatic polyamides and shaped articles thereof prepared from the reaction of symmetrical aromatic diamines containing preformed amide linkages and aliphatic diacid derivatives.

Another object of the invention is to provide a process for the preparation of aromatic-aliphatic copolyamides.

Other objects and advantages of the invention will become apparent from the description which follows.

These objects, in general, preferably are accomplished by preparing an acidic solution or a neutral slurry of a symmetrical aromatic diamine containing a preformed amide linkage, adding to this solution a proton acceptor, an emulsifier, and a solution of a suitable aliphatic dicarboxylic acid derivative, preferably an acid chloride, and stirring the resulting mixture until the polymerization reaction is completed. The polymer may then be recovered, preferably by filtering, washing and drying.

The aromatic aliphatic copolyamides of this invention may be represented by the following general formula

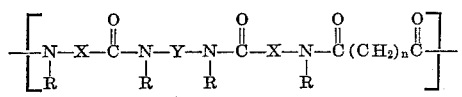

wherein R is hydrogen, or lower alkyl, X represents a single, multiple or fused ring aromatic radical and may have one or more of the hydrogens in each ring replaced by nonpolyamide-forming substituents such as alkyl, aryl halogen, alkoxy and the like, Y represents any aromatic radical such as those mentioned for X provided such radical is symmetrical, that is, it must have at least one plane of symmetry, and $n$ is an integer of from 0 to 10 carbon atoms. Examples of such polymers include poly-N,N'-m-phenylenebis(m-benzamido) adipamide,

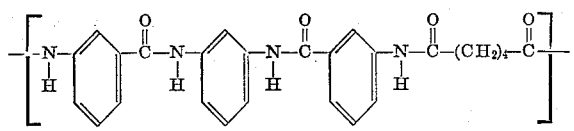

poly-N,N'-p-phenylenebis(m-benzamido) adipamide,

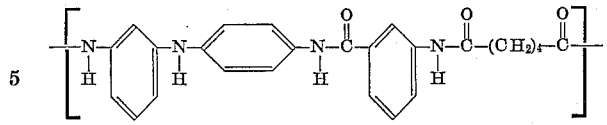

poly - N,N' - 4,4-biphenylenebis(m-benzamido)glutaramide,

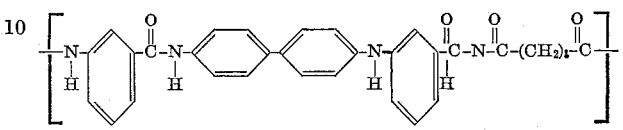

poly-N,N'-m-phenylenebis(m-benzamido) succinimide,

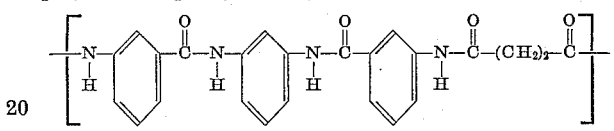

poly-N,N'-2,7 - naphthyelnebis(m-benzamido) pimelamide,

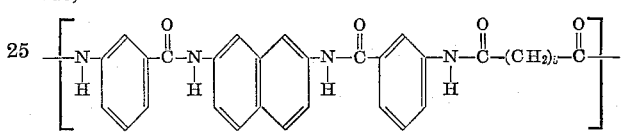

poly-N,N'-m-phenylenebis(m-benzamido) suberamide,

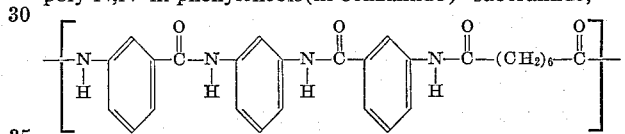

poly-N,N'-m-phenylenebis(m-benzamido) azelamide,

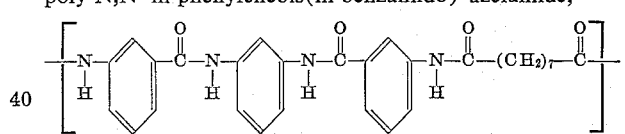

poly-N,N'-dimethyl-p-phenylenebis(m-benzamido) sebacamide,

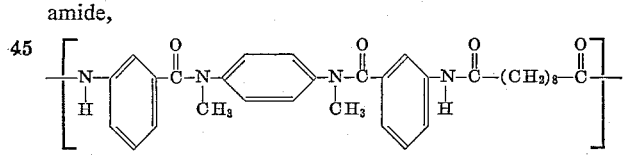

The preparation of these polymers involves either the interfacial or solution technique. The solution polymerization method may be generally described as follows. The diamine is dissolved in a suitable solvent which is inert to the polymerization reaction. The same solvents may be employed for both the diamine and the diacid derivative. Among such solvents there may be mentioned dimethylacetamide, 1,2-pyrrolidone, 1,5-dimethylpyrrolidone and hexamethylphosphoramide. These solvents are rendered more effective in many instances by mixing them with a smaller amount, up to 10 percent, of an alkali or alkaline earth salt such as lithium chloride, lithium bromide, magnesium chloride, magnesium bromide, beryllium chloride or calcium chloride. The preferred solvent for solution polymerization is dimethylacetamide or dimethylacetamide containing 5 percent dissolved lithium chloride. The diamine solution is cooled to between 0 and —20° C. The diacid chloride is added either as a solid or in a solution of the aforementioned solvents. The mixture is then stirred for a period of time until polymerization is substantially complete and a high viscosity is obtained. The solutions of polymer may be neutralized by the addition of lithium hydroxide and other suitable neutralizing agents.

The interfacial polymerization reaction is conducted by mixing water, an emulsifier and the diamine or its dihydrochloride. The proton acceptor is then added and the mixture stirred rapidly. During this rapid stirring a solution of the diacid halide in an organic solvent is added. The mixture is stirred until polymerization is complete. The polymer may then be isolated, preferably by filtration, and is washed and dried. The diacid halide solvent may be a cyclic nonaromatic oxygenated organic solvent such as cyclic tetramethylene sulfone, 2, 4-dimethyl cyclic tetramethylene sulfone, tetrahydrofuran, propylene oxide and cyclohexanone. Further suitable solvents for the diacid halide when using an interfacial reaction include chlorinated hydrocarbons such as methylene chloride, chloroform and chlorobenzene, also benzene, acetone and nitrobenzene, benzonitrile, acetophenone, acetonitrile, toluene and mixtures of the above solvents such as tetrahydrofuran and benzonitrile, tetrahydrofuran and acetophenone, benzene and acetone, and the like.

Suitable emulsifying agents for interfacial polymerization include anionic and nonionic compounds such as sodium lauryl sulfate, nonyl phenoxy (ethyleneoxy) ethane, the sodium or potassium salt of any suitable condensed sulfonic acid and the like.

A proton acceptor as the term is employed herein indicates a compound which acts as an acid scavenger to neutralize HCl as formed during the reaction keeps the reaction going until completion. Suitable proton acceptors include sodium carbonate, sodium hydroxide, potassium hydroxide, tertiary amines such as triethyl amine, trimethyl amine, tripropyl amine, ethyl dimethyl amine, tributyl amine and similar compounds which react as desired.

The amounts of the various reactants which may be employed will, of course, vary according to the type of polymer desired. However, in most instances, substantially equimolar quantities or a slight excess of diacid halide to diamine may be used. For interfacial polymerization reactions, sufficient proton acceptor to keep the acetic by-products neutralized is added, the exact amount easily determined by one skilled in the art.

The diamines which are used in the practice of the invention have the following general formula:

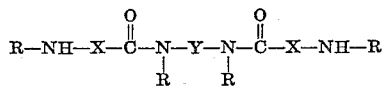

wherein R is hydrogen, lower alkyl or phenyl and wherein X and Y represent aromatic radicals. These aromatic radicals may have a single, multiple or fused ring structure and may have one or more of the hydrogens in each ring replaced by nonpolyamide-forming substituents, such as alkyl aryl halogen, alkoxy and the like. These diamines are referred to as symmetrical diamines because they will enter into the polymerization reaction in a fixed or ordered manner depending upon the configuration of the diamine. These diamines must be symmetrical in order to result in a polyamide having desirable characteristics. Since only one Y radical is present, all Y aromatic radicals must be symmetrical; that is, they must have at least one plane of symmetry. This symmetrical configuration is necessary in order for the diamine to be useful in the preparation of high molecular weight crystalline fiber-forming polymers. Since there are two X radicals present, the overall symmetry of the diamine is preserved. For example, Y cannot be 1,7-naphthalene when a fiber-forming composition is desired because it is not a symmetrical radical. Whereas, X may be 1,7-naphthalene or other unsymmetrical radicals. Thus, it may be seen that the diamine of the invention may have all phenylene rings or may have a combination of phenylene, naphthalene and biphenylene rings, whether substituted or unsubstituted, or other multiple and fused ring structures so long as the overall symmetry of the diamine is maintained. A further disclosure of these diamines and a method for their preparation is revealed in copending application of Preston et al., Serial No. 222,933, filed September 11, 1962, now U.S. Patent 3,242,213.

A typical preparation of one such diamine, N,N'-m-phenylenebis(m-aminobenzamide), as disclosed in the above-noted copending application was accomplished as follows.

A solution of 38 grams of m-nitrobenzoyl chloride in 40 ml. of dry chloroform was prepared and poured all at once into a Blendor jar containing 10.8 grams of m-phenylenediamine, 0.1 gram of sodium n-lauryl sulfonate as an emulsifier and 13 grams of potassium hydroxide dissolved in 200 ml. of water. The reaction mixture was agitated rapidly, filtered and re-washed with warm water and filtered again. The resulting dried product, the intermediate in the preparation of the diamine, which may be called N,N'-m-phenylenebis(m-nitrobenzamide) was obtained in 85 percent yield and had a melting point of approximately 270° C. A 5 gm. portion of this intermediate was placed in a 250 ml. flask and refluxed with 50 ml. of absolute ethanol. The mixture was then cooled and a solution prepared by dissolving 25 gms. of stannous chloride hydrate in 30 ml. of concentrated hydrochloric acid with 50 ml. of absolute ethanol was added. A clear solution was obtained upon refluxing about 30 minutes. When the solution cooled, the diamine hydrochloride crystallized and was filtered, washed with ethanol and filtered again. The diamine was isolated by contacting the hydrochloride with sodium carbonate solution. The product, N,N' - m - phenylenebis(m - aminobenzamide) was obtained in approximately 70 percent yield and had a melting point of 212° C. As typical examples of suitable diamines coming within the scope of the above general formula, there may be mentioned, N,N'-m-phenylenebis(m-aminobenzamide),
N,N'-m-phenylenebis(p-aminobenzoamide),
N,N'-p-phenylenebis(m-aminobenzamide),
N,N'-p-phenylenebis(p-aminobenzamide),
N,N'-2,7-naphthylenebis(p-aminobenzamide),
N,N'-1,5-naphthylenebis(m-aminobenzamide),
N,N'-1,5-naphthylenebis(p-aminobenzamide),
N,N'-2,7-naphthylenebis(m-aminobenzamide),
N,N'-m-phenylenebis(7-amino-2-naphthalamide),
N,N'-tetramethyl-p-phenylenebis(4-aminobiphenyl-4-carbonamide) and the like.

The aliphatic dicarboxylic acids which are useful in the invention include any of the well known oxalic acid series, the acids normally being employed in the form of their acid chloride or other acid halide as represented by the general formula:

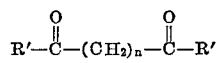

wherein $n$ may be from 0 to 10 and R' is Cl⁻, Br⁻, or I⁻. Examples include oxalic, malonic, succinic, glutaric, adipic, pimelic, suberic, azelic and sebacic acids.

The polymers of this invention have many highly desirable characteristics. The flexibility of the polymer chain in these aromatic-aliphatic ordered copolyamides and their intermediate melting point renders them useful as blending components with polyamides and other polymeric compositions to increase modulus and impart to them other valuable characteristics. The aromatic-aliphatic ordered copolyamides of the invention are easily soluble and their lower melting points facilitate their utility for many molding applications such as coatings, filters, etc. These polyamides produce excellent filaments, fibers and films of intermediate temperature resistance.

To further illustrate the present invention and the advantages thereof, the following specific examples are given, it being understood that these are merely intended to be illustrative. In the examples all parts and percents are by weight unless otherwise indicated.

*Example I.—Preparation of poly-N,N'-m-phenylenebis(m-benzamido) adipamide*

A solution prepared by heating 3.46 g. (0.01 mol) of N,N' - m - phenylenebis(m - aminobenzamide) with 44 ml. of 0.5 NHCl was cooled and placed in a Blendor jar with 0.1 g. of sodium lauryl sulfate, ice and 5 g. sodium carbonate. A solution of 1.83 g. (0.01 mol) of adipyl chloride in 50 ml. of tetrahydrofuran was added to the above solution and the mixture stirred for 20 minutes. The resulting polymer was filtered, washed and dried. The polymer was soluble in dimethyl acetamide containing 5 percent lithium chloride and a film was cast from a solution of the polymer. A differential thermal analysis thermogram indicated that the polymer has a $T_g$ at 220° C. and melts with decomposition at 350° C.

*Example II.—Preparation of poly-N,N'-dimethyl-p-phenylenebis(m-benzamido) sebacamide*

To a solution of 0° C. of 0.37 g. (0.001 mol) N,N'-dimethyl-p-phenylenebis(m-aminobenzamide) in 2 cc. dimethylacetamide (DMAc) was added 0.25 g. (0.001 mol) sebacyl chloride. Next, 2 cc. DMAc containing 5 percent dissolved lithium chloride was added because the polymer formed was not immediately soluble. During the two hour period of stirring which followed, the solution increased in viscosity. The solution was neutralized with lithium hydroxide, 0.084 g., then poured into water. The melting point of the dried polymer was 200° C. Fibers were pulled from a melt of the polymer and films were cast from a solution of the polymer in DMAc containing 5 percent dissolved lithium chloride.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the invention is intended to be included within the scope of the claims.

I claim:
1. An aromatic aliphatic ordered copolyamide composed of recurring structural units of the formula

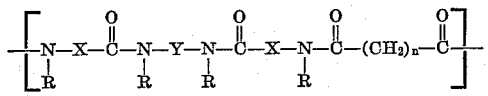

wherein R is selected from the group consisting of hydrogen and lower alkyl, X and Y represent divalent aromatic hydrocarbon radicals containing up to 10 carbon atoms, wherein X may and Y must exhibit at least one plane of symmetry, and wherein n is an integer of from 0 to 10 carbon atoms.

2. An aromatic-aliphatic copolyamide composed of recurring structural units of the formula

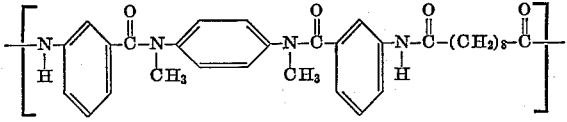

3. An aromatic-aliphatic copolyamide composed of recurring structural units of the formula

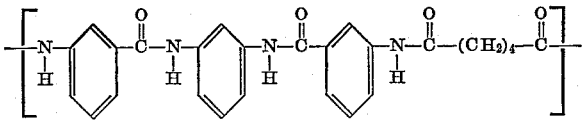

4. An aromatic-aliphatic copolyamide composed of recurring structural units of the formula

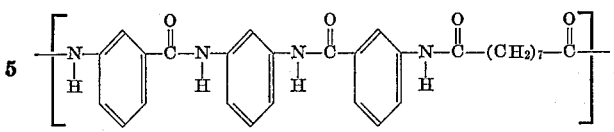

5. An aromatic-aliphatic copolyamide composed of recurring structural units of the formula

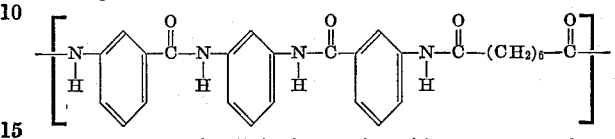

6. An aromatic-aliphatic copolyamide composed of recurring structural units of the formula

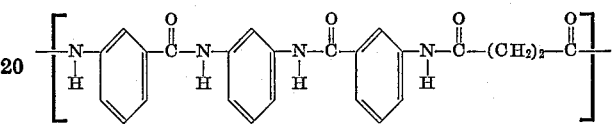

7. The aromatic-aliphatic copolyamide of claim 1 in the form of a fiber.
8. The aromatic-aliphatic copolyamide of claim 1 in the form of a film.
9. A process for the preparation of aromatic aliphatic copolyamides comprising mixing substantially equimolar proportions of a solution of an aromatic diamine of the general formula

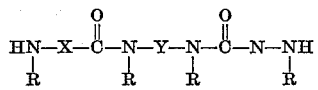

wherein R is selected from the group consisting of hydrogen, lower alkyl and phenyl and X and Y represent divalent aromatic hydrocarbon radicals in an organic solvent with an aliphatic dicarboxylic acid halide of the general formula $$R'\overset{O}{\underset{\|}{C}}(CH_2)_n\overset{O}{\underset{\|}{C}}R'$$

wherein n is an integer of from 0 through 10 and R' represents a halogen radical, maintaining the reaction mass at a temperature of between about 0° C. and −20° C. and stirring in the presence of a proton acceptor to produce a polymeric product.

10. The process of claim 9 wherein R is hydrogen and X and Y are m-phenylene.

11. A process for the preparation of poly-N,N'-m-phenylenebis(m-benzamido) adipamide comprising mixing substantially equimolar proportions of a solution of N,N'-m-phenylenebis(m-aminobenzamide) in an organic solvent and adipyl chloride maintaining the reaction mass at a temperature of between about 0° C. and −20° C. and stirring in the presence of a proton acceptor to produce a polymeric product.

12. The process of claim 11 wherein the proton acceptor is sodium carbonate.
13. The process of claim 11 wherein the solvent is tetrahydrofuran.
14. The process of claim 11 wherein the solvent is dimethylacetamide containing 5 percent lithium chloride.

References Cited by the Examiner

UNITED STATES PATENTS

| | | | |
|---|---|---|---|
| 2,688,011 | 8/1954 | Wheatley et al. | 260—78 |
| 3,094,511 | 6/1963 | Hill et al. | 260—78 |
| 3,142,662 | 7/1964 | Huffman | 260—78 |
| 3,203,933 | 8/1965 | Huffman et al. | 260—78 |
| 3,206,439 | 9/1965 | Detoro et al. | 260—78 |

WILLIAM H. SHORT, *Primary Examiner.*
H. D. ANDERSON, *Assistant Examiner.*